(12) United States Patent
Sloan

(10) Patent No.: US 9,117,325 B1
(45) Date of Patent: Aug. 25, 2015

(54) CHARCOAL DISPENSING APPARATUS

(71) Applicant: James W. Sloan, Marseilles, IL (US)

(72) Inventor: James W. Sloan, Marseilles, IL (US)

( * ) Notice: Subject to any disclaimer, the term of this patent is extended or adjusted under 35 U.S.C. 154(b) by 92 days.

(21) Appl. No.: 13/959,108

(22) Filed: Aug. 5, 2013

(51) Int. Cl.
    *G07F 13/02* (2006.01)
    *F24B 15/04* (2006.01)
    *G01F 11/14* (2006.01)

(52) U.S. Cl.
    CPC .................. *G07F 13/02* (2013.01); *F24B 15/04* (2013.01); *G01F 11/14* (2013.01)

(58) Field of Classification Search
    CPC ......... G01F 11/00; G01F 11/14; G01F 11/18; G01F 13/001; G07F 11/00; G07F 11/40; G07F 13/00; G07F 13/02; F27D 3/10; F24B 15/04
    USPC ......... 222/344, 354, 355, 361, 366, 425, 450, 222/453, 2; 414/199; D23/410; 221/196; 220/2; 141/137; 126/283; 110/108, 110/116, 117
    See application file for complete search history.

(56) References Cited

U.S. PATENT DOCUMENTS

| | | | |
|---|---|---|---|
| 371,829 A * | 10/1887 | Ennis | 194/203 |
| 535,250 A * | 3/1895 | Kehl | 126/283 |
| 649,471 A * | 5/1900 | Nelsen | 126/283 |
| 988,932 A | 4/1911 | Eberman | |
| 1,198,014 A * | 9/1916 | Dun Lany | 222/361 |
| 1,458,024 A | 6/1923 | Benson | |
| 2,630,941 A | 3/1953 | Cappellini | |
| D267,539 S | 1/1983 | Russo | |
| D275,987 S | 10/1984 | Schlegel | |
| 4,531,658 A * | 7/1985 | Galopin | 222/181.2 |
| 4,582,225 A * | 4/1986 | Peden et al. | 222/135 |
| 6,739,331 B1 | 5/2004 | Cohen | |
| 7,500,567 B2 | 3/2009 | Matticx | |
| 8,157,129 B2 * | 4/2012 | Kawanishi et al. | 222/56 |

* cited by examiner

*Primary Examiner* — Daniel R Shearer
*Assistant Examiner* — Nicholas J Weiss

(57) ABSTRACT

A charcoal dispensing apparatus dispenses charcoal into a bag. The apparatus includes a base and a post attached to and extending upwardly from the base. A drawer frame is coupled to a top end edge of the post. A hopper is attached to the drawer frame and is configured to store and dispense a plurality of charcoal briquettes. A slot is positioned in the drawer frame. A second drawer is slidably insertable into the slot and is configured to receive charcoal from the hopper when the second drawer is positioned within the slot. The second drawer is configured to dispense charcoal outwardly therefrom when the second drawer is extended outwardly of the drawer frame.

11 Claims, 4 Drawing Sheets

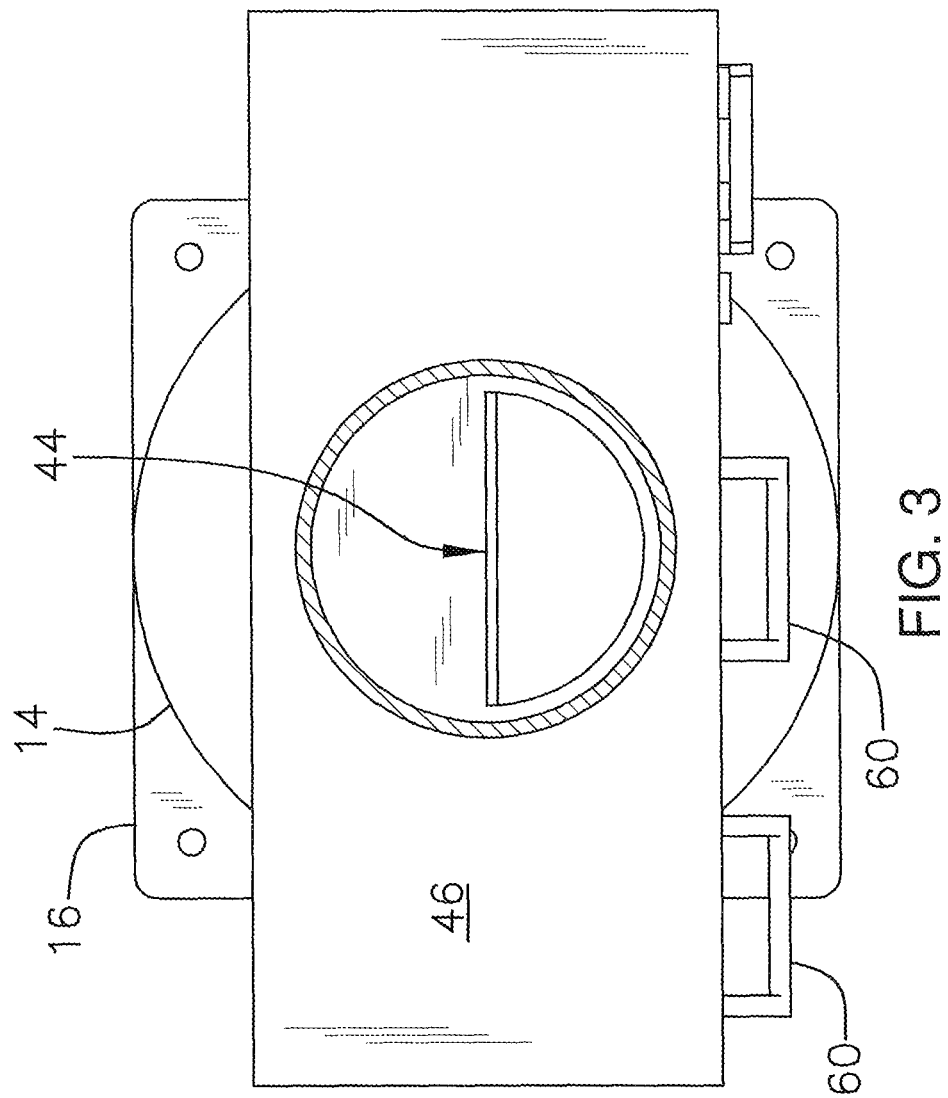

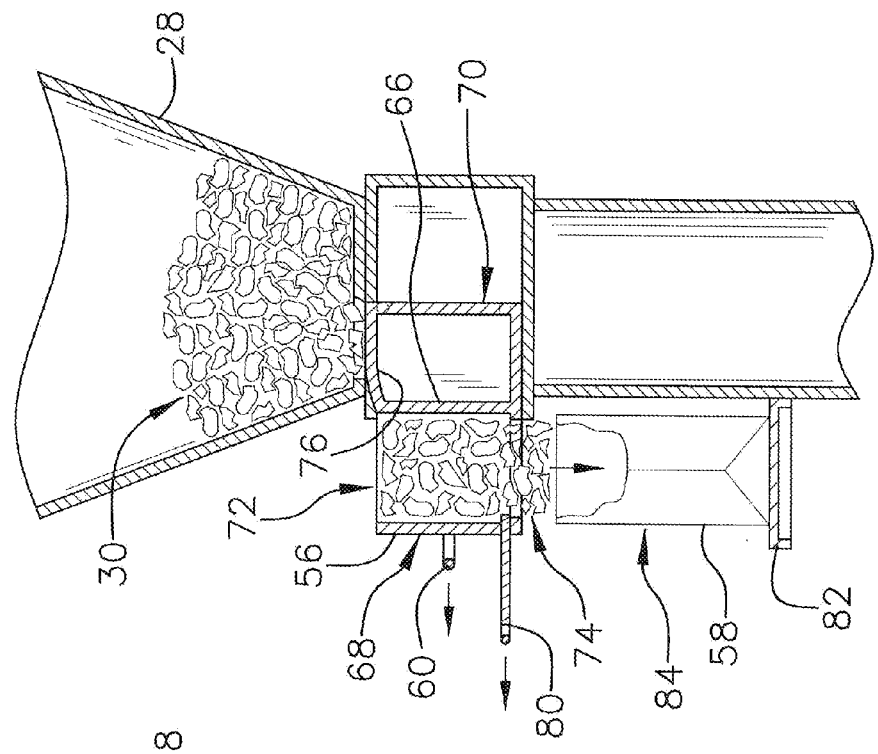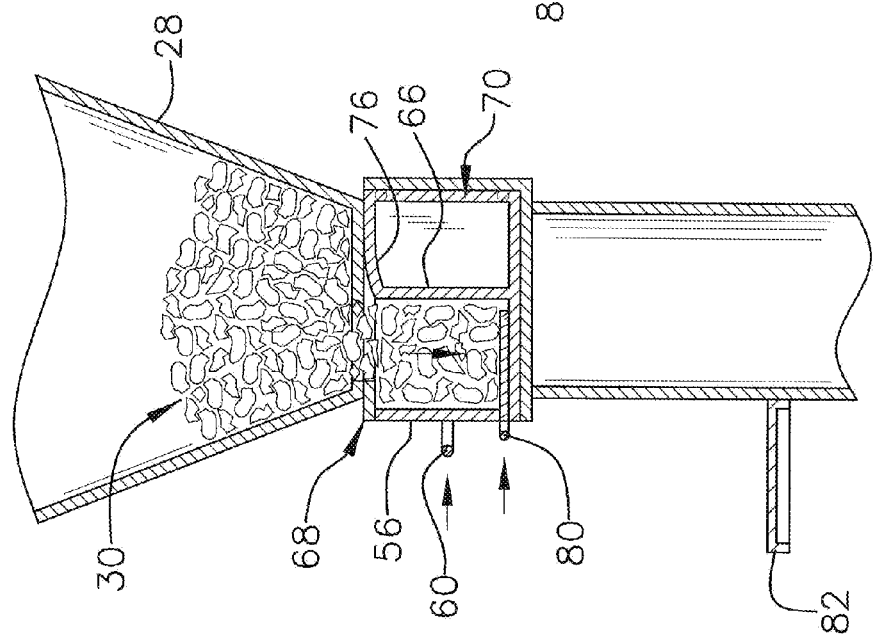

CHARCOAL DISPENSING APPARATUS

BACKGROUND OF THE DISCLOSURE

Field of the Disclosure

The disclosure relates to dispensing devices and more particularly pertains to a new dispensing device for dispensing charcoal into a bag.

SUMMARY OF THE DISCLOSURE

An embodiment of the disclosure meets the needs presented above by generally comprising a base and a post attached to and extending upwardly from the base. A drawer frame is coupled to a top end edge of the post. A hopper is attached to the drawer frame and is configured to store and dispense a plurality of charcoal briquettes. A slot is positioned in the drawer frame. A second drawer is slidably insertable into the slot and is configured to receive charcoal from the hopper when the second drawer is positioned within the slot. The second drawer is configured to dispense charcoal outwardly therefrom when the second drawer is extended outwardly of the drawer frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a top view of an embodiment of the disclosure taken along line 3-3 of FIG. 2.

FIG. 4 is a cross-sectional view of an embodiment of the disclosure taken along line 4-4 of FIG. 2.

FIG. 5 is a cross-sectional view of an embodiment of the disclosure similar to FIG. 4, except that FIG. 5 shows each of the dispensing plate and the second drawer being fully extended.

DESCRIPTION OF THE PREFERRED EMBODIMENT

Figure 1:
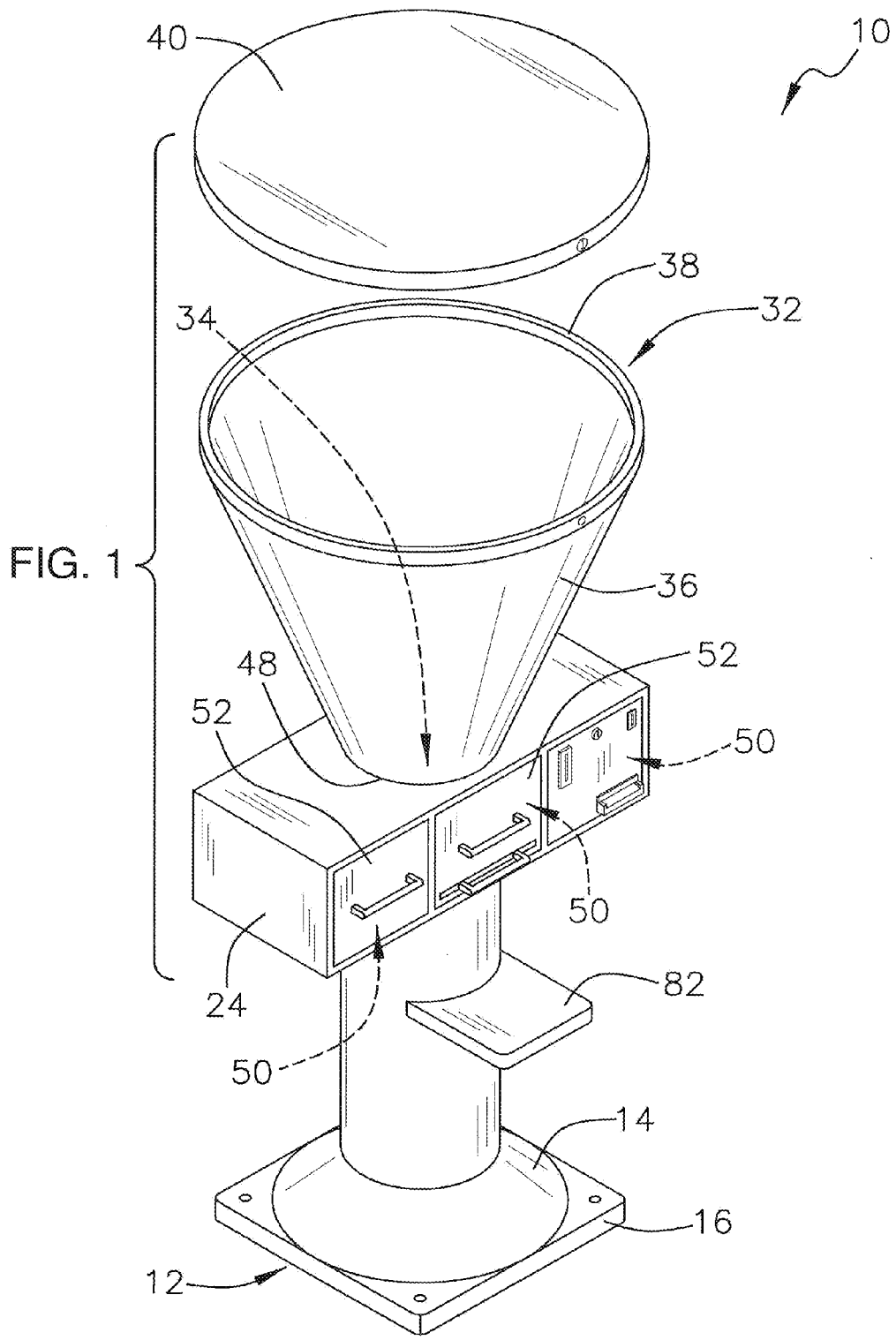
FIG. 1 is a top front side perspective view of a charcoal dispensing apparatus according to an embodiment of the disclosure.
Figure 2:
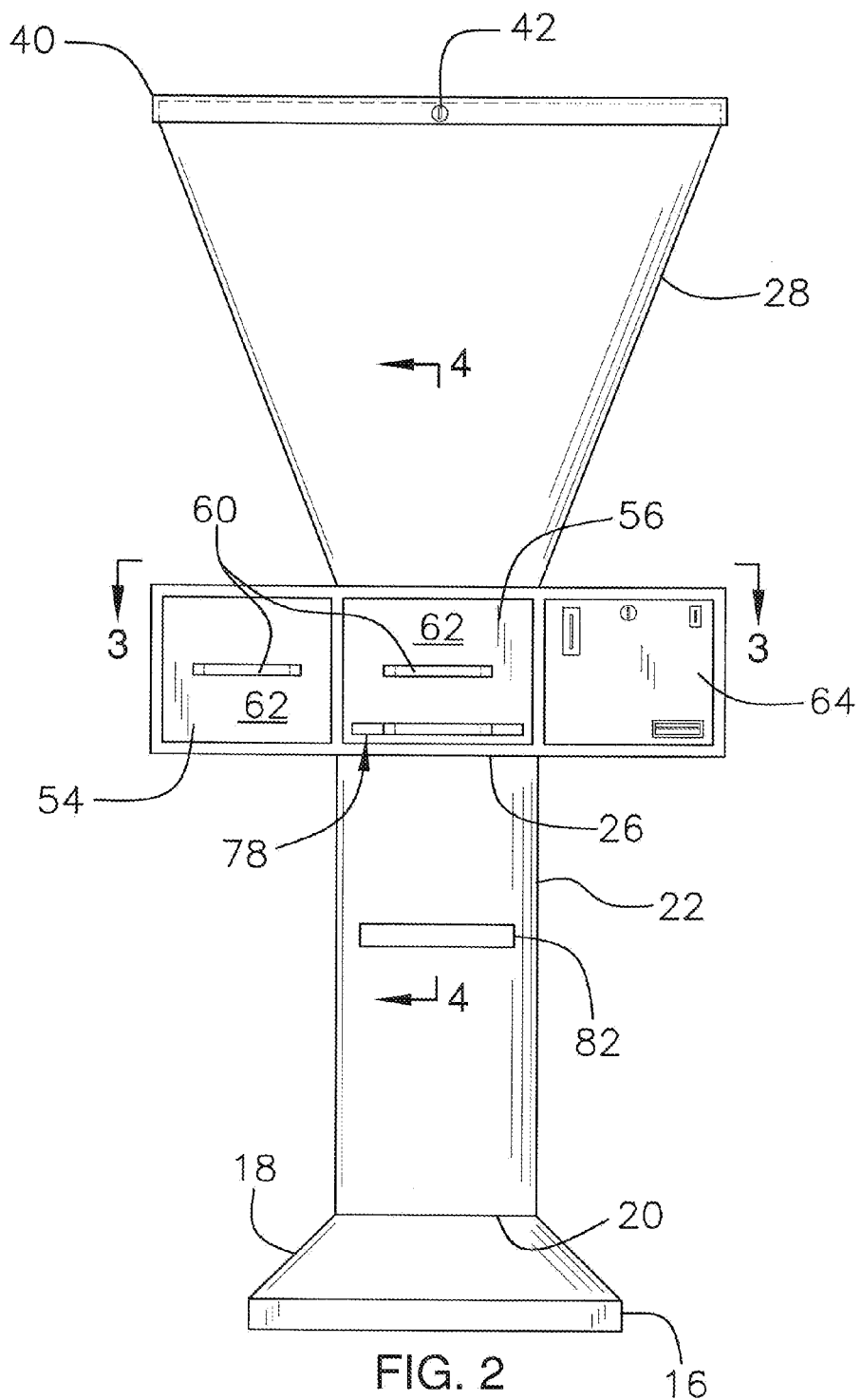
FIG. 2 is a front view of an embodiment of the disclosure.

With reference now to the drawings, and in particular to FIGS. 1 through 5 thereof, a new dispensing device embodying the principles and concepts of an embodiment of the disclosure and generally designated by the reference numeral 10 will be described.

As best illustrated in FIGS. 1 through 5, the charcoal dispensing apparatus 10 generally comprises a base 12 having an upper section 14 mounted on a lower section 16. The lower section 16 may be planar. The upper section 14 may be annular. A perimeter wall 18 of the upper section 14 may slant upwardly and inwardly toward a top side 20 of the upper section 14. A post 22 is attached to and extends upwardly from the top side 20.

A drawer frame 24 is coupled to a top end edge 26 of the post 22. A hopper 28 is attached to the drawer frame 24. The hopper 28 is configured to store and dispense a plurality of charcoal briquettes 30. The hopper 28 has an open top end 32, an open bottom end 34, and a peripheral wall 36 extending between the open top end 32 and the open bottom end 34. An upper perimeter edge 38 of the hopper 28 defines an access opening into the open top end 32. The peripheral wall 36 may taper outwardly from the open bottom end 34 to the open top end 32. A lid 40 is removably positioned on the hopper 28 and releasably engages the upper perimeter edge 38 to close the access opening. A locking mechanism 42 is coupled to the lid 40 and the hopper 28 wherein the locking mechanism 42 selectively engages the upper perimeter edge 38 of the hopper 28 to removably couple the lid 40 to the hopper 28. An aperture 44 is positioned in a top surface 46 of the drawer frame 24. A lower perimeter edge 48 of the hopper 28 is positioned around the aperture 44 such that charcoal 30 positioned within the hopper 28 is dispensed outwardly through the aperture 44.

A plurality of slots 50 is positioned in the drawer frame 24. A pair of drawers 52 is provided. Each of the drawers 52 is slidably insertable into an associated one of the slots 50. The drawers 52 include a second drawer 54 and a first drawer 56. The second drawer 54 is configured for holding a plurality of bags 58. The first drawer 56 is positioned below the aperture 44 when the first drawer 56 is positioned within the associated one of the slots 50. A handle 60 is coupled to a front wall 62 of each of the drawers 52. A vending box 64 may be positioned in an associated one of the slots 50. The vending box 64 is configured for accepting payment from a user in exchange for the dispensing of charcoal 30. The vending box 64 operates on the honor system such that a user is expected to pay for each time charcoal 30 is dispensed from the apparatus 10 even though charcoal 30 can be dispensed without payment.

A dividing wall 66 extends through the first drawer 56 and defines a front compartment 68 and a rear compartment 70. The front compartment 68 has an open top 72 and an open bottom 74. The open top 72 of the front compartment 68 is positioned below the aperture 44 when the first drawer 56 is positioned in the associated one of the slots 50 wherein the front compartment 68 is configured to receive charcoal 30 from the hopper 28 through the open top 72 of the front compartment 68. Thus, the front compartment 68 is refilled with charcoal 30 each time the first drawer 56 is retracted into the drawer frame 24. The front compartment 68 is configured to hold between 1.0 pound and 1.5 pounds of charcoal 30. The rear compartment 70 may have an arcuate upper wall 76 such that the arcuate upper wall 76 is configured to retain charcoal 30 within the hopper 28 when the first drawer 56 is extended outwardly of the drawer frame 24.

A slit 78 extends into the front wall 62 of the second drawer 56. The slit 78 is positioned proximate the open bottom 74 of the front compartment 68. A dispensing plate 80 is slidably insertable into and out of the slit 78. The dispensing plate 80 extends over and fully covers the open bottom 74 of the front compartment 68 when the dispensing plate 80 is fully retracted into the slit 78. The dispensing plate 80 is configured to selectively release charcoal 30 from the front compartment 68 when the first drawer 56 is extended outwardly of the drawer frame 24 and the dispensing plate 80 is extended outwardly of the slit 78.

A shelf 82 is coupled to and extends outwardly from the post 22. The shelf 82 is planar and positioned transverse relative to a longitudinal axis of the post 22. The shelf 82 is positioned below the open bottom 74 of the front compartment 68 when the first drawer 56 is extended outwardly of the drawer frame 24. The shelf 82 is configured for supporting one of the bags 58 in an upright position 84 such that the bag 58 is configured to receive charcoal 30 from the front compartment 68 when each of the first drawer 56 and the dispensing plate 80 is extended. A foldable funnel may be attached to the open bottom 74 of the front compartment 68 to facilitate dumping of charcoal 30 into the bag 58.

The apparatus may have a length between approximately 110.0 centimeters and 130.0 centimeters and a height between approximately 170.0 centimeters and 190.0 centimeters. The apparatus 10 may be constructed from plastic or like material.

In use, as stated above and shown in the Figures, a user inserts currency into the vending box 64. The second drawer 54 is opened and a bag 58 is removed therefrom. The bag 58 is placed on the shelf 82 in an upright position 84. The first drawer 56 is opened and the dispensing plate 80 is extended outwardly of the slit 78. In this manner, charcoal 30 is dispensed out of the hopper 28 and into the bag 58. The lid 40 is removed to refill the hopper 28 with charcoal 30 as needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A charcoal dispensing device comprising:
   a base;
   a post attached to and extending upwardly from said base;
   a drawer frame coupled to a top end edge of said post;
   a hopper attached to said drawer frame, said hopper being configured to store and dispense a plurality of charcoal briquettes;
   a slot positioned in said drawer frame; and
   a first drawer being slidably insertable into said slot, said first drawer being configured to receive charcoal from said hopper when said first drawer is positioned within said slot, said first drawer being configured to dispense charcoal outwardly therefrom when said first drawer is extended outwardly of said drawer frame;
   said slot being one of a plurality of slots such that said first drawer is slidably insertable into an associated one of said slots; and
   a second drawer being slidably insertable into an associated one of said slots, said second drawer being configured for holding a plurality of bags;
   an aperture positioned in a top surface of said drawer frame, a lower perimeter edge of said hopper being positioned around said aperture wherein said aperture is configured to dispense charcoal outwardly from said hopper;
   said first drawer being positioned below said aperture when said first drawer is positioned within said associated one of said slots;
   a dividing wall extending through said first drawer and defining a front compartment and a rear compartment, said front compartment having an open top and an open bottom, said open top of said front compartment being positioned below said aperture when said first drawer is positioned in said associated one of said slots wherein said front compartment is configured to receive charcoal from said hopper through said open top of said front compartment;
   a slit extending into a front wall of said first drawer, said slit being positioned proximate said open bottom of said front compartment; and
   a dispensing plate being slidably insertable into and out of said slit, said dispensing plate extending over and fully covering said open bottom of said front compartment when said dispensing plate is fully retracted into said slit, said dispensing plate being configured to selectively release charcoal from said front compartment when said first drawer is extended outwardly of said drawer frame and said dispensing plate is extended outwardly of said slit.

2. The device of claim 1, further comprising said base having an upper section mounted on a lower section, said lower section being planar, said upper section being annular, a perimeter wall of said upper section slanting upwardly and inwardly toward a top side of said upper section.

3. The device of claim 1, further comprising said hopper having an open top end, an open bottom end, and a peripheral wall extending between said open top end and said open bottom end, an upper perimeter edge of said hopper defining an access opening into said open top end.

4. The device of claim 3, further comprising said peripheral wall tapering outwardly from said open bottom end to said open top end.

5. The device of claim 3, further comprising a lid being removably positioned on said hopper and releasably engaging said upper perimeter edge to close said access opening.

6. The device of claim 5, further comprising a locking mechanism coupled to said lid and said hopper wherein said locking mechanism selectively engages said upper perimeter edge of said hopper to removably couple said lid to said hopper.

7. The device of claim 1, further comprising a handle coupled to a front wall of each of said drawers.

8. The device of claim 1, further comprising said rear compartment having an arcuate upper wall such that said arcuate upper wall is configured to retain charcoal within said hopper when said first drawer is extended outwardly of said drawer frame.

9. The device of claim 1, further comprising a shelf coupled to and extending outwardly from said post, said shelf being planar and positioned transverse relative to a longitudinal axis of said post, said shelf being positioned below said open bottom of said front compartment when said first drawer is extended outwardly of said drawer frame, said shelf being configured for supporting one of said bags in an upright position such that said bag is configured to receive charcoal from said front compartment when each of said first drawer and said dispensing plate is extended.

10. The device of claim 1, further comprising a vending box positioned in an associated one of said slots, said vending box being configured for accepting payment from a user in exchange for the dispensing of charcoal.

11. A charcoal dispensing device comprising:

a base having an upper section mounted on a lower section, said lower section being planar, said upper section being annular, a perimeter wall of said upper section slanting upwardly and inwardly toward a top side of said upper section;

a post attached to and extending upwardly from said top side;

a drawer frame coupled to a top end edge of said post;

a hopper attached to said drawer frame, said hopper being configured to store and dispense a plurality of charcoal briquettes, said hopper having an open top end, an open bottom end, and a peripheral wall extending between said open top end and said open bottom end, an upper perimeter edge of said hopper defining an access opening into said open top end, said peripheral wall tapering outwardly from said open bottom end to said open top end;

a lid being removably positioned on said hopper and releasably engaging said upper perimeter edge to close said access opening;

a locking mechanism coupled to said lid and said hopper wherein said locking mechanism selectively engages said upper perimeter edge of said hopper to removably couple said lid to said hopper;

an aperture positioned in a top surface of said drawer frame, a lower perimeter edge of said hopper being positioned around said aperture wherein said aperture is configured to dispense charcoal outwardly from said hopper;

a plurality of slots positioned in said drawer frame;

a pair of drawers, each of said drawers being slidably insertable into an associated one of said slots, said drawers including a first drawer and a second drawer, said second drawer being configured for holding a plurality of bags, said first drawer being positioned below said aperture when said first drawer is positioned within said associated one of said slots;

a handle coupled to a front wall of each of said drawers;

a dividing wall extending through said first drawer and defining a front compartment and a rear compartment, said front compartment having an open top and an open bottom, said open top of said front compartment being positioned below said aperture when said first drawer is positioned in said associated one of said slots wherein said front compartment is configured to receive charcoal from said hopper through said open top of said front compartment, said rear compartment having an arcuate upper wall such that said arcuate upper wall is configured to retain charcoal within said hopper when said first drawer is extended outwardly of said drawer frame;

a slit extending into said front wall of said first drawer, said slit being positioned proximate said open bottom of said front compartment;

a dispensing plate being slidably insertable into and out of said slit, said dispensing plate extending over and fully covering said open bottom of said front compartment when said dispensing plate is fully retracted into said slit, said dispensing plate being configured to selectively release charcoal from said front compartment when said first drawer is extended outwardly of said drawer frame and said dispensing plate is extended outwardly of said slit;

a shelf coupled to and extending outwardly from said post, said shelf being planar and positioned transverse relative to a longitudinal axis of said post, said shelf being positioned below said open bottom of said front compartment when said first drawer is extended outwardly of said drawer frame, said shelf being configured for supporting one of said bags in an upright position such that said bag is configured to receive charcoal from said front compartment when each of said first drawer and said dispensing plate is extended; and a vending box positioned in an associated one of said slots, said vending box being configured for accepting payment from a user in exchange for the dispensing of charcoal.

\* \* \* \* \*